United States Patent
Fukuda et al.

(10) Patent No.: US 8,860,964 B2
(45) Date of Patent: Oct. 14, 2014

(54) COMPUTER READABLE MEDIUM, PRINT CONTROL APPARATUS, PRINT CONTROL METHOD, AND PRINT SYSTEM MONITORING THE STORING OF JOB AND JOB TICKET INTO SECOND FOLDER

(75) Inventors: Masahiro Fukuda, Tokyo (JP); Yoshikazu Tanaka, Tokyo (JP); Hongyang Guo, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 254 days.

(21) Appl. No.: 13/358,011

(22) Filed: Jan. 25, 2012

(65) Prior Publication Data

US 2012/0194862 A1  Aug. 2, 2012

(30) Foreign Application Priority Data

Feb. 1, 2011 (JP) ................................. 2011-020222
Dec. 9, 2011 (JP) ................................. 2011-269819

(51) Int. Cl.
*G06F 3/12* (2006.01)

(52) U.S. Cl.
CPC ............ *G06F 3/1204* (2013.01); *G06F 3/1288* (2013.01); *G06F 3/1253* (2013.01); *G06F 3/1256* (2013.01); *G06F 3/127* (2013.01)
USPC ........... 358/1.13; 358/1.15; 358/1.1; 715/744

(58) Field of Classification Search
USPC ......... 358/1.15, 1.14, 1.1, 1.13; 715/277, 744
See application file for complete search history.

(56) References Cited

U.S. PATENT DOCUMENTS

| 7,295,336 | B2 | 11/2007 | Yoshida et al. | |
|---|---|---|---|---|
| 7,603,618 | B2 | 10/2009 | Mori et al. | |
| 2003/0090717 | A1 | 5/2003 | Yoshida et al. | |
| 2005/0237572 | A1 | 10/2005 | Mori et al. | |
| 2006/0256360 | A1 * | 11/2006 | Kayama | 358/1.13 |
| 2009/0040558 | A1 * | 2/2009 | Schwier | 358/1.15 |
| 2010/0103461 | A1 * | 4/2010 | Inui | 358/1.15 |

FOREIGN PATENT DOCUMENTS

| JP | 2000-118095 A | 4/2000 |
|---|---|---|
| JP | 2004005748 A | 1/2004 |
| JP | 2005-242661 A | 9/2005 |
| JP | 2005-311477 A | 11/2005 |
| JP | 2009-104303 A | 5/2009 |
| JP | 2009-146277 A | 7/2009 |

* cited by examiner

*Primary Examiner* — Benny Q Tieu
*Assistant Examiner* — Martin Mushambo
(74) *Attorney, Agent, or Firm* — Harness, Dickey & Pierce, P.L.C.

(57) ABSTRACT

A computer is disclosed that performs a print control process. The computer sets a process performed for a job stored in a first folder into a setting storage area. The computer monitors storing the job into the first folder, and stores the job stored in the first folder and a job ticket indicating the process performed for the job stored in the first folder set in the setting storage area into a second folder. Also, the computer monitors storing the job and the job ticket into the second folder, and activates a job edit program to have an operator edit the job after the process indicated by the job ticket is performed for the job stored in the second folder.

13 Claims, 16 Drawing Sheets

NEW PROGRAM

PRINTER: [printer ▼]

| PROGRAM MANAGEMENT | PAGINATION/ SHEET TYPE | PAGE EDIT | HEADER/ FOOTER EDIT | FINISHING | OUTPUT METHOD |

500

501 — ☐ ACTIVATE JOB EDIT PROGRAM BEFORE PRINTING

200B — ☑ PRINT

VOLUMES: [1 ◄►]

COLOR/BLACK&WHITE: ⊙COLOR ○BLACK&WHITE

EJECT TO: [AUTOMATIC TRAY SELECTION ▼]

PRINT METHOD: [REGULAR PRINT ▼]

☐ PRINT FROM FINAL PAGE

☐ FACE-UP EJECTION

PRINT LOCATION FINE ADJUSTMENT

TOP (−)/BOTTOM (+): [0 ◄►] mm

LEFT (−)/RIGHT (+): [0 ◄►] mm

☑ STORE AS PRINT JOB

STORE-TO FOLDER:
[C:¥MRData¥NEW FOLDER] [REFER...]

CHARACTER STRING ADDED TO BEGINNING:
[PRINT JOB]

☐ SECURE FILE WITH PASSWORD [ ]

☑ STORE AS PDF FILE

STORE-TO FOLDER:
[C:¥MRData¥] [REFER...]

CHARACTER STRING ADDED TO BEGINNING:
[PDF FILE]

☐ SECURE FILE WITH PASSWORD [ ]

DATA COMPRESSION LEVEL:
[LOW (QUALITY PRIORITY) ▼]

[OK] [CANCEL]

FIG.16

| MAIN ITEMS | FUNCTIONS | INDICATION CONTENTS |
|---|---|---|
| PAGE EDIT | INCLINATION CORRECTION | SELF-CORRECTION ONLY (PROCESS TARGET:BLACK&WHITE IMAGE) |
| | ISOLATED POINT ELIMINATION | PARAMETERS SUCH AS LEVEL INDICATION etc. (PROCESS TARGET:BLACK&WHITE IMAGE) |
| | FRAME DELETION | FRAME MARGIN (MARGINS FROM TOP, BOTTMO, RIGHT, AND LEFT EDGES) (PROCESS TARGET:IMAGE) |
| | CENTER DELETION | DELETION RANGES FROM CENTER (RIGHT&LEFT, AND UP&DOWN)(PROCESS TARGET:IMAGE) |
| HEADER/FOOTER EDIT | PAGE NUMBERING | STYLE, LOCATION, COLOR |
| | HEADER/FOOTER | CHARACTER STRING, IMAGE FILE, LOCATION, COLOR |
| PAGINATION/ SHEET TYPE | PAGINATION TYPE | PAGINATION TEMPLATE, PAGINATION TYPE&PARAMETER |
| PRINT SETTING | OUTPUT PRINTER | SELECTION FROM REGISTERED PRINTER |
| | COLOR/BLACK&WHITE PRINT | COLOR PRINT/BLACK&WHITE PRINT (EXCEPTION OF PAGE IS NOT ALLOWED) |
| | POST-STAGE SETTING | STAPLE, PUNCH, BIND, FOLD, CUT |
| OUTPUT | PRINT | ACTIVATE OR NOT JOB EDIT PROGRAM BEFORE PRINT |
| | FILE OUTPUT | OUTPUT-TO FOLDER, PDF FILE NAME FORMAT:PDF (NOT INCLUDING INSERTING PAPER) |
| | JOB STORAGE | OUTPUT FOLDER, JOB FILE NAME (SPECIFIC FORMAT) |

COMPUTER READABLE MEDIUM, PRINT CONTROL APPARATUS, PRINT CONTROL METHOD, AND PRINT SYSTEM MONITORING THE STORING OF JOB AND JOB TICKET INTO SECOND FOLDER

BACKGROUND OF THE INVENTION

1. Field of the Invention

The present invention is related to a computer readable medium, a print control apparatus, a print control method, and a print system for editing a job.

2. Description of the Related Art

In a commercial print business, a benefit is given by receiving a copy (a catalogue, an advertisement, or the like) from a customer, generating a printed output object, and shipping the printed output object to the customer. Multiple steps are performed from receiving the copy to shipping the printed output object. The multiple steps include a pre-press operation, a proof print, a post-process, and a shipping operation. In the pre-press operation, the copy is received from the customer, a print condition of the printed output object is accepted, a color is adjusted, a layout is modified, and a binding location is adjusted. In the proof print, a pre-press result is confirmed by the customer. In the post-process, a printing operation is conducted, and the printed output object is pressed and bound after the printing operation. In the shipping operation, the printed output object is shipped to the customer. Steps from receiving the copy to shipping the printed output object are increased depending on the print condition of the printed output object.

In a conventional commercial print business, an order of the copy which needs a large amount of prints has been generally received. Accordingly, mass production of the printed output object is performed in the above steps. For the copy for which the mass production is performed, the print condition of the printed output object, which is requested by the customer, is mostly fixed. Thus, in the conventional commercial print business, a mass printing is performed with a single fixed print condition, and another mass printing is performed by changing the print condition after a lot of the mass printing ends. In this print operation cycle, the printed output object desired by the customer is generated.

In the print operation cycle, the above-described multiple steps are generally conducted in a case in which the print condition is changed. Accordingly, when there is no change of the print condition, it is possible for a commercial print agency to conduct a successive printing operation in the same steps, and to efficiently perform a mass print operation.

Recently, in the commercial print business, a POD (Print On Demand) market has appeared in which a relatively small quantity of lots of the printed output object is shipped within a shorter lead time, so-called "POD". In the POD market, orders are received from multiple customers. As a result, in the POD market, many variations of the copy sent to the commercial print agency and many modifications of the print condition for the printed output object are demanded.

Also, recently, the copy has been digitalized, and control for generating the printed output object has been conducted by a computer. For example, a technology related to a workflow has appeared in which electronic data for the copy are received through a network, and the above-described multiple steps are controlled. For example, in the workflow, the print operation formed by the multiple steps may be defined by using a job ticket, so-called "JDF (Job Definition Format)", and the print operation may be controlled by a print system.

In order to correspond to market changes of the commercial print business, the commercial print agency advances computerization of the print system to generate the printed output object by using a received copy. On the other hand, the commercial print agency is further required to build the print system to correspond to a variety of the print conditions of the print output object from the customer. Moreover, to generate a variety of the print output object desired by the customer, multiple printer apparatuses and peripheral devices related to the print system need to be installed. Also, the print cycle including the multiple steps needs to be conducted in a relatively shorter time at an operation step side.

The above-described measures are conducted by the commercial print agency. However, business efficiency needs to be further improved to realize a benefit. One of measures taken to improve the business efficiency is to simplify the print operation.

For example, in the pre-press operation, as an edit operation of the print data (job), pagination or stapling may be required. In general, as the edit operation of the job, a method using a hot folder is known. In multiple folders in which files are classified and stored, the hot folder is regarded as a folder in which a certain action is made for a file input into the folder and which is used to produce a product.

The edit operation of the job using the hot folder automatically performs a process of an edit content defined beforehand in the hot holder, for the file input into the hot folder. A job edit operation using the hot folder has been conventionally known (for example, refer to Japanese Laid-open Patent Application No. 2009-104303).

In the edit operation of the job using the hot folder, there is a case in which an operator such as the commercial print agency confirms whether a layout of the print data is accurately set, based on an edit result of the job, and re-edits if necessary. In this case, the job is queued in an edit waiting queue or the like. Then, the operator confirms the edit result of the job and conducts a re-edit operation.

That is, after the operator recognizes that the job is queued in the edit waiting queue, the operator confirms the edit result of the job and conducts the re-edit operation. However, the operator for inputting the job into the hot folder and the operator for confirming the edit result of the job and conducting the re-edit operation may not be the same person.

In a case in which a first operator inputs the job into the hot folder and a second operator different from the first operator confirms the edit result of the job and conducts the re-edit, the second operator may not recognize timing at which the job is input into the hot holder. Accordingly, in a case in which the job is queued in the edit waiting queue or the like, multiple jobs are retained until the second operator conducts the re-edit. In order to prevent this problem, the second operator for confirming the edit result of the job is required to frequently monitor the edit waiting queue.

SUMMARY OF THE INVENTION

The present invention solves or reduces one or more of the above problems.

In one aspect of this disclosure, there is provided a non-transitory computer readable medium storing a program which, when executed by a computer, causes the computer to perform a print control process including setting a process performed for a job stored in a first folder to a setting storage area; monitoring storing the job in the first folder, and storing the job stored in the first folder and a job ticket indicating the process performed for the job stored in the first folder set in the setting storage area into a second folder; and processing the job by monitoring storing the job and the job ticket into the second folder, and by activating a job edit program to have an operator edit the job after the process indicated by the job ticket is performed for the job stored in the second folder.

As other aspects of this disclosure, component elements, expressions, or a combination of arbitrary component elements may be applied to a method, an apparatus, a system, a computer program, a data structure, and the like.

BRIEF DESCRIPTION OF THE DRAWINGS

In the following, embodiments of the present invention will be described with reference to the accompanying drawings.

FIG. 14 is a diagram illustrating another example of the hot folder setting screen;

FIG. 15 is a diagram illustrating another example of the hot folder setting screen; and FIG. 16 is a diagram illustrating an example of functions settable from the hot folder setting screen.

DESCRIPTION OF THE PREFERRED EMBODIMENTS

In the following, an embodiment according to the present invention will be described with reference to the accompanying drawings.

First Embodiment

<System Configuration>

Figure 1:
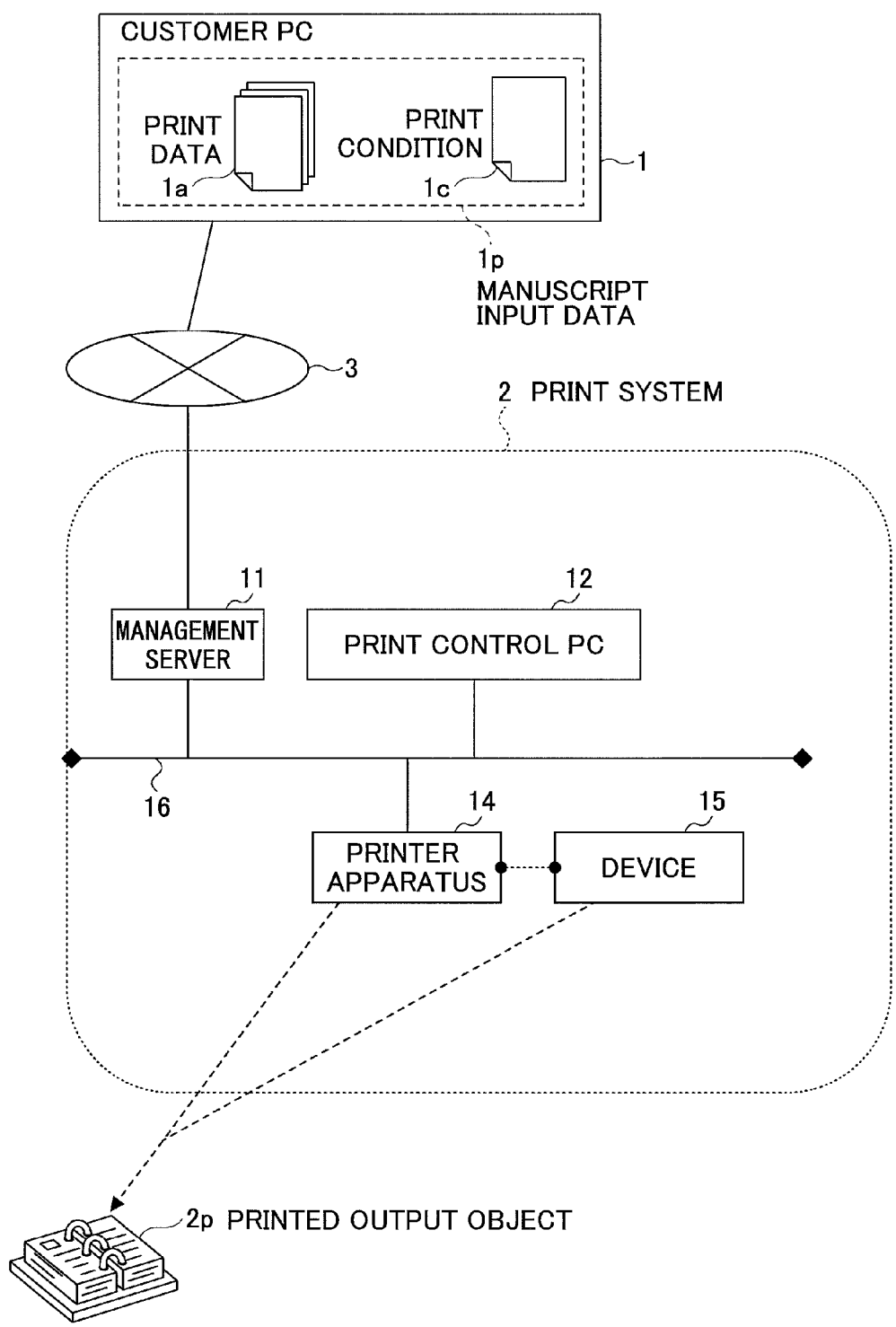
FIG. 1 is a diagram illustrating an example of a system configuration including a print system to which the present invention is applied.

FIG. 1 is a diagram illustrating an example of a system configuration including a print system 2 to which the present invention is applied. In FIG. 1, a customer PC 1 is connected to the print system 2 through a network 3 such as the Internet or the like. The customer PC 1 is used by a customer. The print system 2 is used by a user such as a commercial print agency or the like.

Also, the print system 2 includes a management server 11, a print control PC 12, a printer apparatus 14, a device 15, and a network 16 such as a LAN (Local Area Network). The management server 11, the print control PC 12, and the printer apparatus 14 are connected through the network 16.

The management server 11 is used to manage manuscript input data 1p sent from the customer PC 1. The print control PC 12 is used to conduct print control. The printer apparatus 14 is used to print a printed output object 2p. The device 15 is necessary to conduct a print process and a post-process, and is connected to the printer apparatus 14.

The customer operates the customer PC 1, and sends print data 1a and a print condition 1c for a copy as the manuscript input data 1p through the network 3 to the management server 11. The management server 11 manages the manuscript input data 1p received from the customer PC 1. An operator, who uses the print system 2 to produce the printed output object 2p, accesses the management server 11 from the print control PC 12 and acquires the manuscript input data 1p. Then, the operator conducts a production operation of the printed output object 2p by the print control described later.

Also, the print control PC 12 acquires information indicating a state, a device capacity, and the like of the printer apparatus 14. The state of the printer apparatus 14 may indicate a state in which the printer apparatus 14 can print, a state in which the printer apparatus 14 cannot print, a state of the device 15 connected to the printer apparatus 14, or the like. The device capability corresponds to a usable sheet setting for the printing, capabilities of the printer apparatus 14 and the device 15, or the like.

Figure 2:
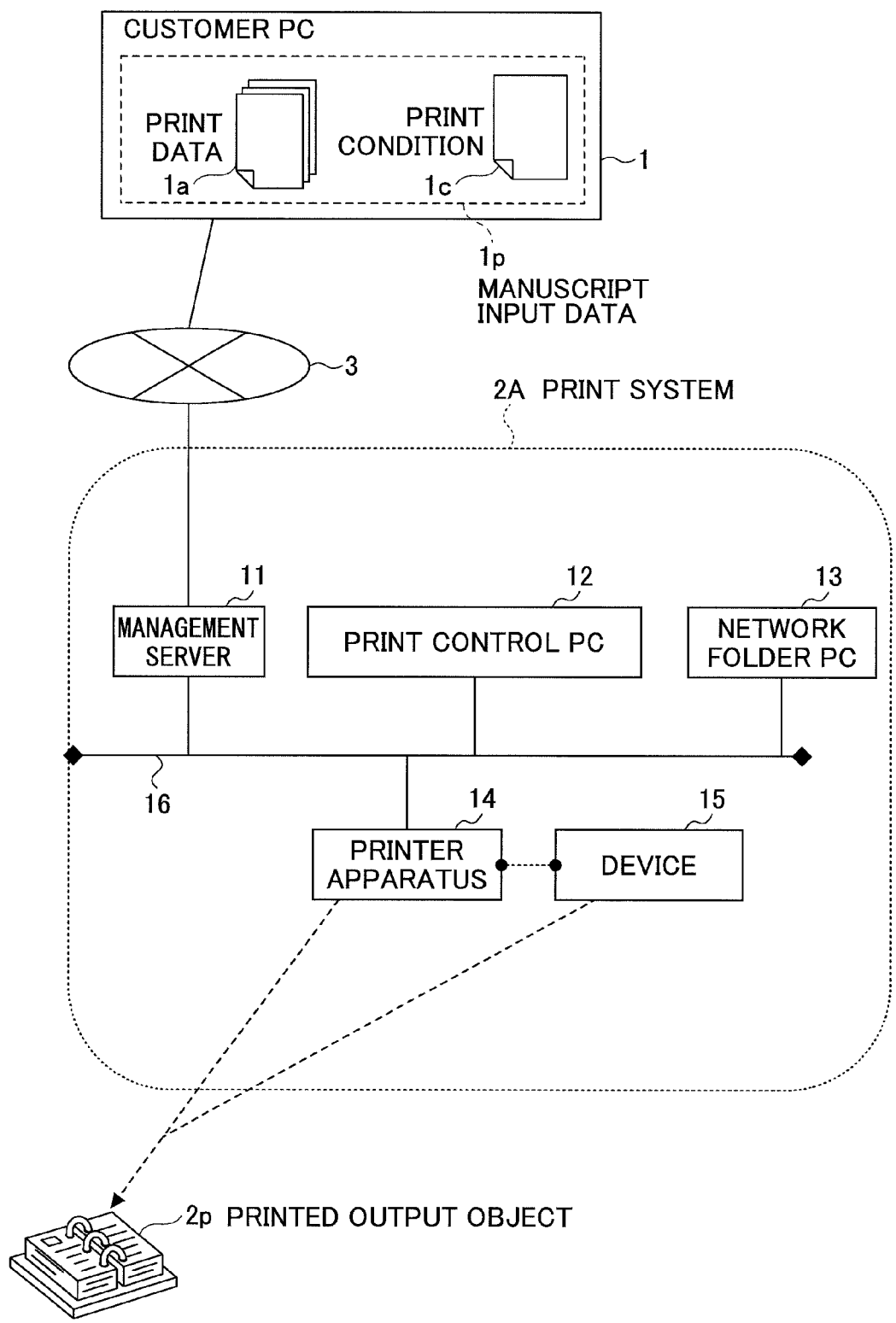
FIG. 2 is a diagram illustrating another example of the system configuration including another print system to which the present invention is applied.

FIG. 2 is a diagram illustrating another example of the system configuration including a print system 2A to which the present invention is applied. The print system 2A in FIG. 2 includes a network folder PC 13 in addition to the print system 2 in FIG. 1. It should be noted that the network folder PC 13 corresponds to an alias of a hot folder described later, and is functionally equivalent to the hot folder. Other components of the print system 2A are similar to those of the print system 2 in FIG. 1, and the explanation thereof will be omitted.

<Hardware Configuration>

Figure 3:
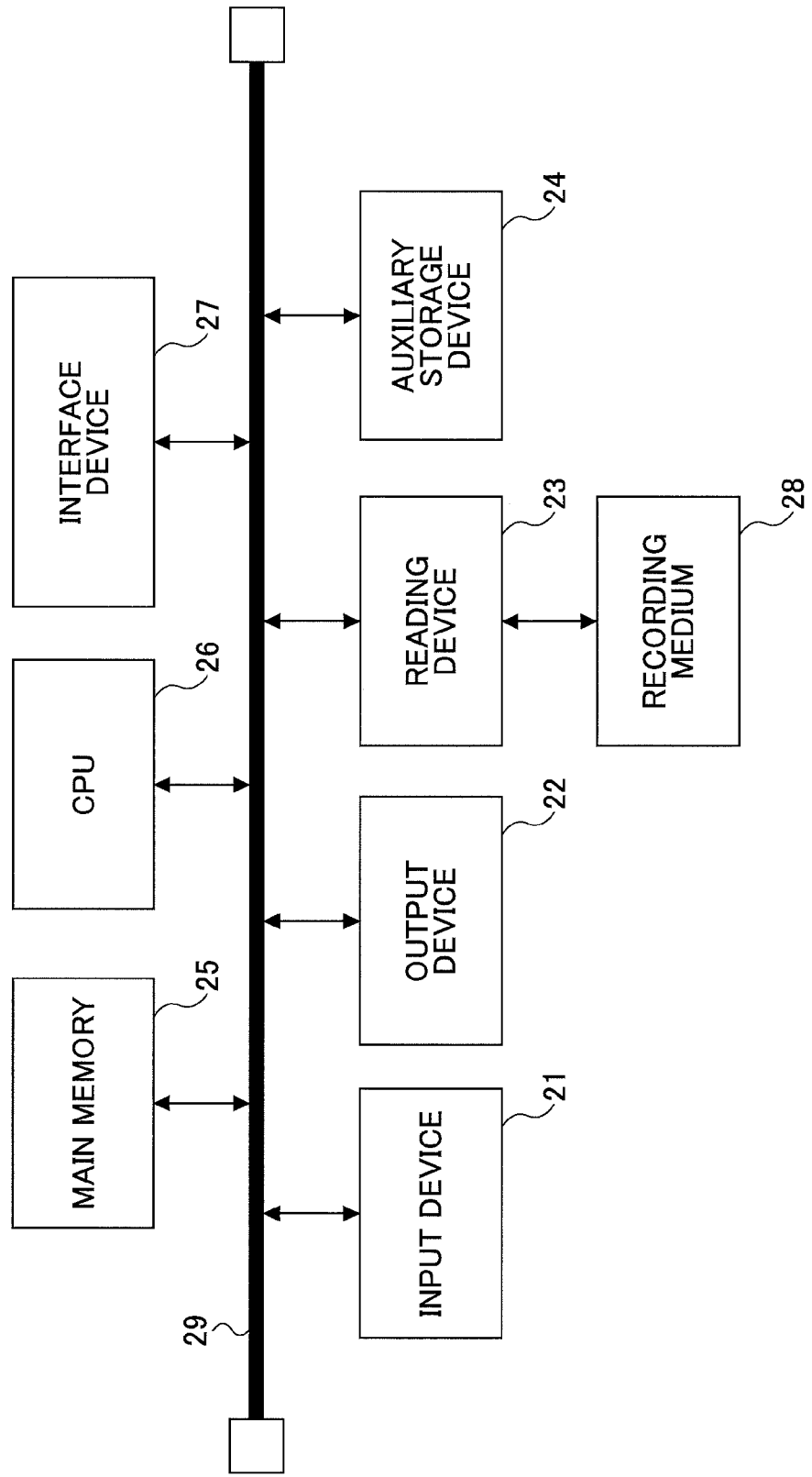
FIG. 3 is a diagram illustrating an example of a hardware configuration of a PC.

Each of the print control PC 12 and the network folder PC 13 is realized by a PC 20 having a hardware configuration illustrated in FIG. 3. FIG. 3 is a diagram illustrating an example of the hardware configuration of the PC 20. The PC 20 includes an input device 21, an output device 22, a reading device 23, an auxiliary storage device 24, a main memory 25, a processor such as a CPU 26, and an interface device 27, which are mutually connected. A storage area may be formed by the auxiliary storage device 24 and/or the main memory 25.

The input device 21 includes a keyboard, a mouse, and the like. The input device 21 is used to input various signals. The output device 22 includes a display device or the like. The output device 22 is used to display various windows, data, and the like. The interface device 27 is used to connect to the network 16.

A print control program (hereinafter, simply called "program") implemented in the print control PC 12 may be one of various programs for controlling the PC 20. For example, the program may be provided by distributing a recording medium 28, by downloading from the network 16, or the like.

For the recording medium 28, various types of recording media being non-transitory (or tangible) computer-readable recording media may be used. For example, it is possible to use, as the recording medium 28, a recording medium such as a Compact Disk Read Only Memory (CD-ROM), a flexible disk, a magnetic optical disk, or the like which optically, electrically, or magnetically records information, a semiconductor memory such as a Read Only Memory (ROM), a flash memory, or the like which electrically records information.

When the recording medium 28 storing the program is set to the reading device 23, the program is installed from the recording medium 28 to the auxiliary storage device 24 through the reading device 23. The program downloaded from the network 16 or the like may be installed from the interface device 27.

The auxiliary storage device 24 stores the installed program, files, data, and the like. When the CPU 26 is instructed to execute the program, the program is read from the auxiliary storage device 24 and stored in the main memory 25. Accordingly, the CPU 26 realizes various processes, which will be described later, in accordance with the program stored in the main memory 25.

<Software Configuration>

Figure 4:
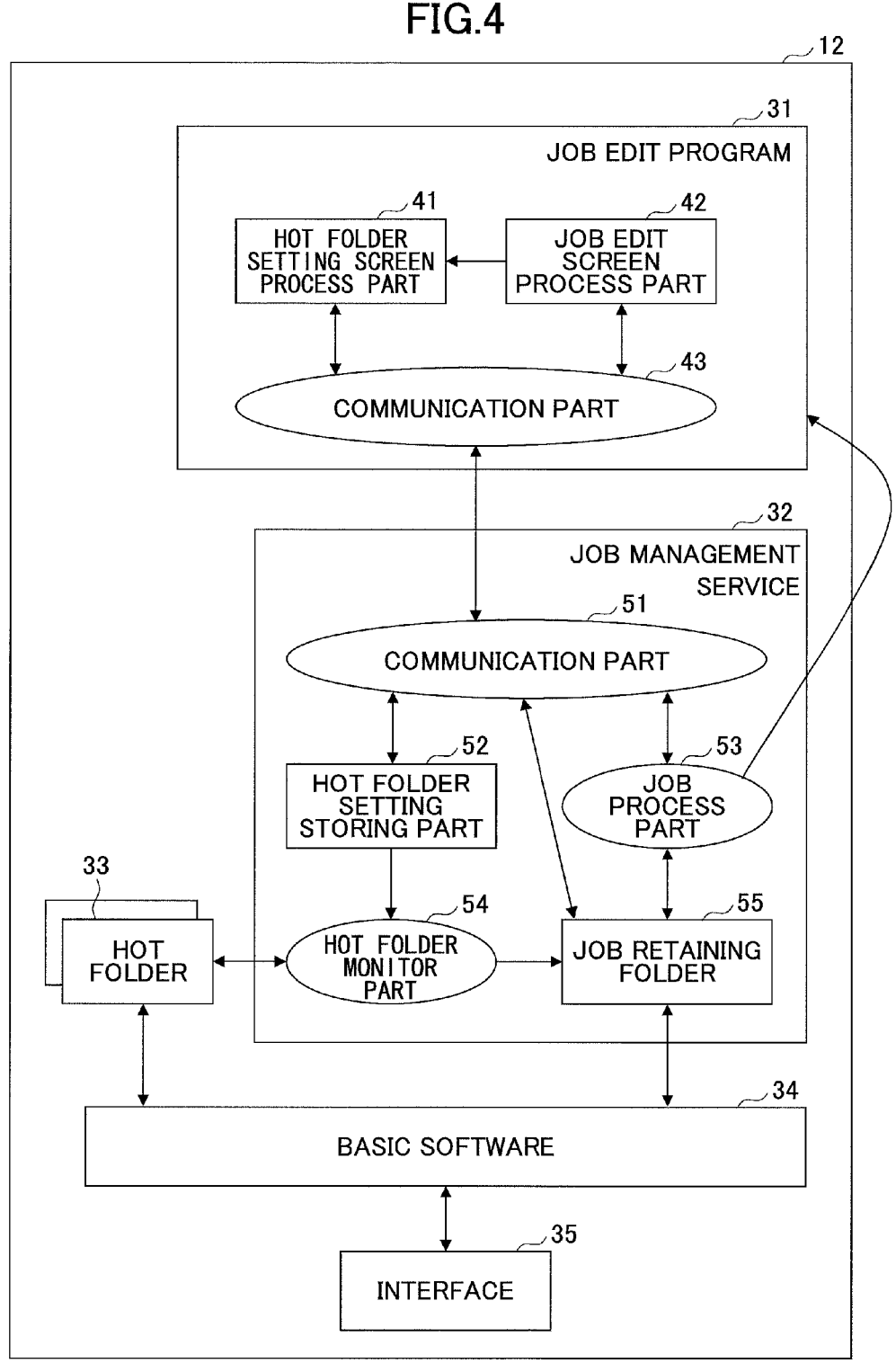
FIG. 4 is a diagram illustrating an example of a software configuration of a print control PC.

In each of the print system 2 in FIG. 1 and the print system 2A in FIG. 2, the print control PC 12 is realized by a software configuration as illustrated in FIG. 4. FIG. 4 is a diagram illustrating an example of a software configuration of the print control PC 12. The print control PC 12 illustrated in FIG. 4 includes a job edit program 31, a job management service 32, a hot folder 33, basic software 34, and an interface 35.

The job edit program 31 causes the PC 20 to execute processes related to a setting of the hot folder 33, and a confirmation of the edit result of the job which uses the hot folder 33. The job management service 32 causes the PC 20 to execute a process related to the edit operation of the job which uses the hot folder 33.

For example, the basic software 34 may be an operating system (OS). The interface 35 is used to connect to the network 16 or the like. The hot folder 33 is used to define the process of the edit content beforehand which is conducted for the job input into the hot folder 33.

The print control PC 12 realizes a hot folder setting screen process part 41, a job edit screen process part 42, and a communication part 43 by executing the job edit program 31. Also, the print control PC 12 realizes a communication part 51, a hot folder setting storing part 52, a job process part 53, a hot folder monitoring part 54, and a job retaining folder 55, by conducting the job management service 32.

The job management service 32 may be regarded as a service residing in background and being activated so as to provide a certain function in response to a request from an operator or software being executed.

Figure 6:
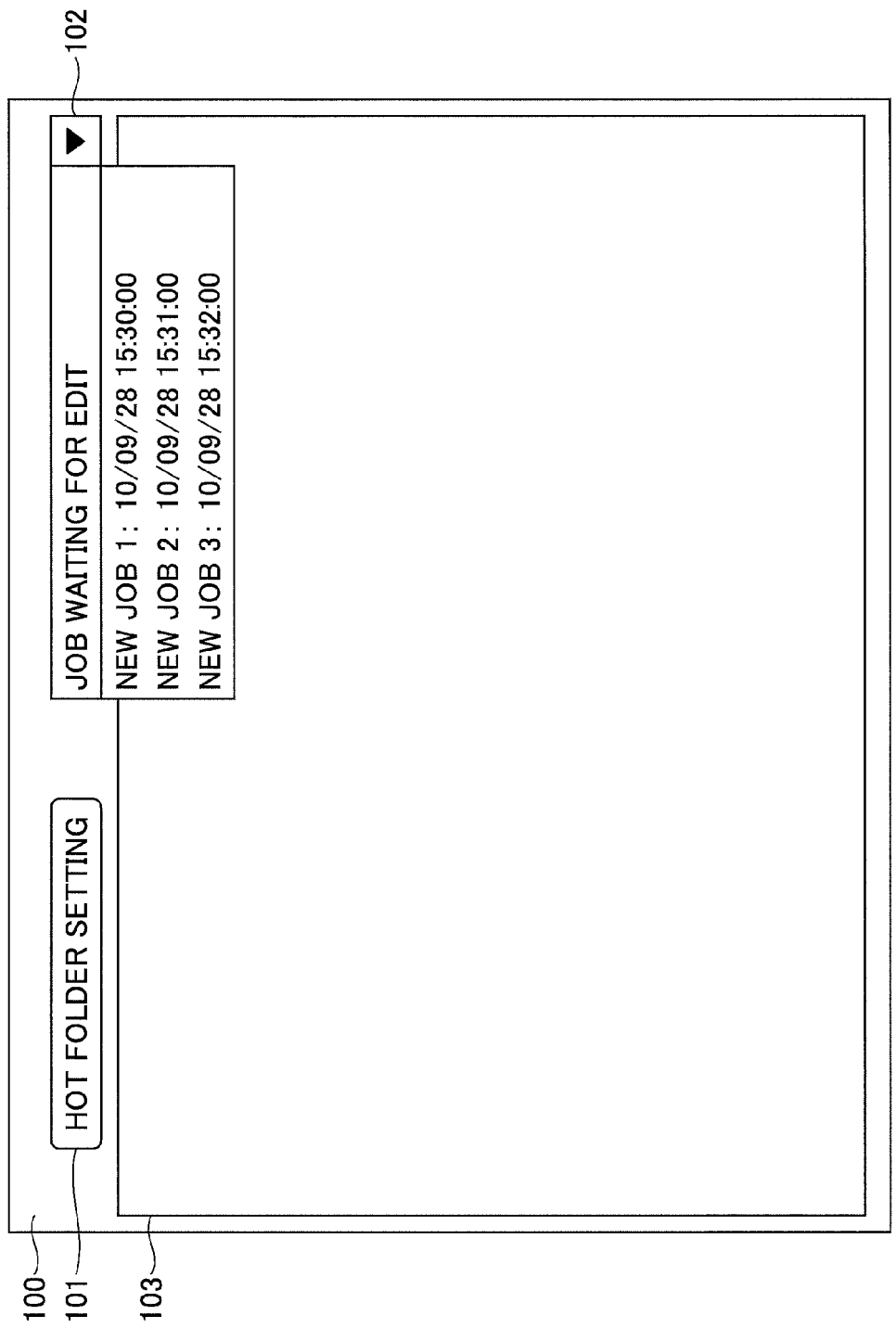
FIG. 6 is a diagram illustrating an example of a job edit screen.
Figure 7:
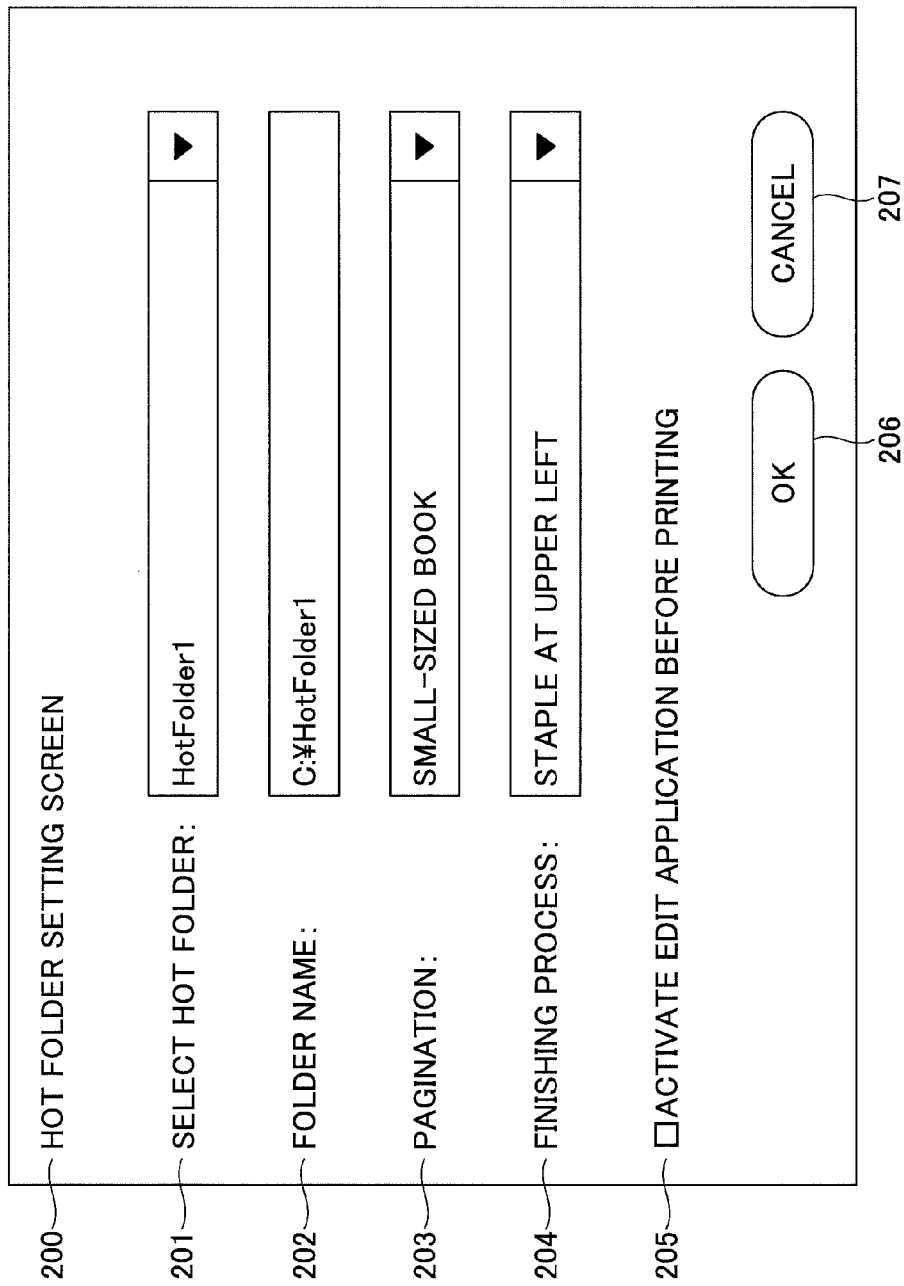
FIG. 7 is a diagram illustrating an example of a hot folder setting screen.

The hot folder setting screen process part 41 of the job edit program 31 performs a process related to a hot folder setting screen 200 which will be described later (FIG. 7). The job edit screen process part 42 performs a process related to a job edit screen 100 which will be described later (FIG. 6).

The communication part 51 of the job management service 32 performs a process related to communications with the communication part 43 of the job edit program 31. The hot folder setting storing part 52 stores setting contents of the hot folder 33 in the storage area. The job process part 53 processes a job stored in the job retaining folder 55 based on the setting contents of the hot folder 33.

The hot folder monitoring part 54 monitors the hot folder 33, and moves the job input from the hot folder 33 to the job retaining folder 55. Also, the hot folder monitoring part 54 generates a job ticket of the setting contents of the hot folder 33 and stores the job ticket in the job retaining folder 55. Also, the job retaining folder 55 stores a job before the job is processed by the job process part 53, a job after the job is processed by the process part 53, and the job ticket.

For example, in a case of conducting a setting of the hot folder 33, after the operator activates the job edit program 31, the operator conducts a display request of the hot folder setting screen 200 from the input device 21. When the display request of the hot folder setting screen 200 is made by the operator, the hot folder setting screen process part 41 displays the hot folder setting screen 200 at the output device 22. The hot folder setting screen 200 is used to conduct the setting of the hot folder 33.

For example, for the setting contents of the hot folder 33, items of an original page edit, a header/footer edit, a pagination/sheet type, a print setting, an output, and the like may be set. Also, the setting contents of the hot folder 33 include an "edit application activation flag" which indicates whether the job edit program 31 is activated after the job is processed by the job process part 53.

The setting contents of the hot folder 33, which are set by the operator at the hot folder setting screen 200, are stored in the hot folder setting storing part 52 from the hot folder setting screen process part 41 through the communication parts 43 and 51.

Also, while monitoring the hot folder 33 by the hot folder monitoring part 54, the job edit program 31 may be activated or may not be activated. An example, in which the job edit program 31 is not activated, will be described.

The hot folder monitoring part 54 monitors the hot folder 33 in accordance with the setting contents stored in the hot folder setting storing part 52. When the job is input into the hot folder 33, the hot folder monitoring part 54 moves the job stored in the hot folder 33 to the job retaining folder 55.

Also, the hot folder monitoring part 54 generates the job ticket for the setting contents (a pagination, a finishing process, and the like) of the hot folder 33 stored in the hot folder setting storing part 52, and stores the job ticket with the job in the job retaining folder 55. Accordingly, based on the setting contents of the job ticket, the job process part 53 conducts a pagination process and the like for the job stored in the job retaining folder 55.

After the pagination process and the like end, when the "edit application activation flag" indicates ON in the setting contents indicated by the job ticket, the job process part 53 activates the job edit program 31. Moreover, the job process part 53 sends an update request of an edit waiting job list, which is a list of jobs waiting for an edit, to the job edit screen process part 42 through the communication parts 51 and 43.

When the job edit screen process part 42 receives the update request of the edit waiting job list, the job edit screen process part 42 acquires a job list of jobs stored in the job retaining folder 55 through the communication parts 43 and 51. For example, the job edit screen process part 42 displays the job edit screen 100, which will be described later, at the output device 22. The job edit screen 100 is used to edit the job.

Figure 5:
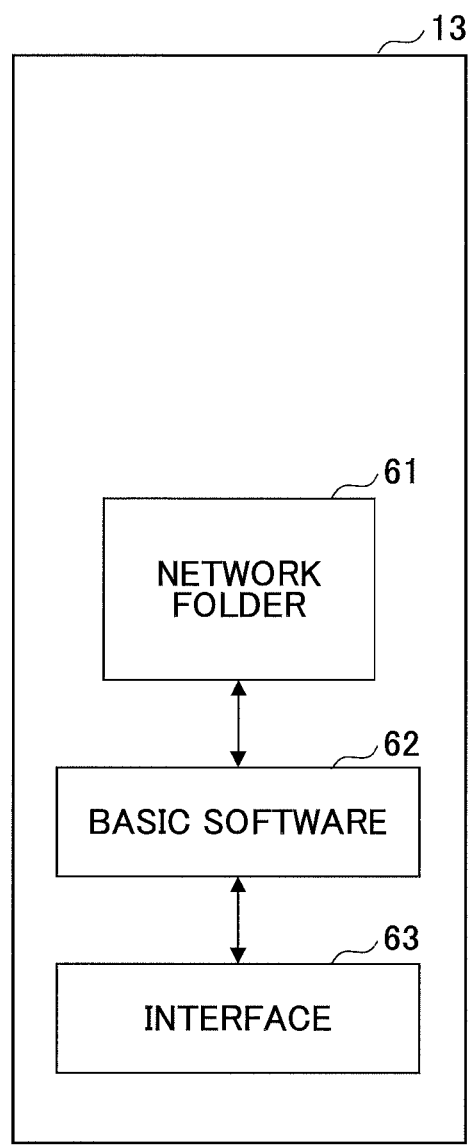
FIG. 5 is a diagram illustrating an example of a software configuration of a network folder PC.

Also, in a case of the print system 2A illustrated in FIG. 2, the network folder PC 13 may be realized by a software configuration as illustrated in FIG. 5. FIG. 5 is a diagram illustrating an example of the software configuration of the network folder PC 13.

The network folder PC 13 illustrated in FIG. 5 includes a network folder 61, basic software 62, and an interface 63. The network folder 61 may be regarded as an alias of the hot folder 33 in FIG. 4. The network folder 61 is connected to the hot folder 33 through the basic software 62, the interface 63, the interface 35 (FIG. 4), and the basic software 34 (FIG. 4), and functions similar to the hot folder 33. For example, the basic software 62 illustrated in FIG. 5 corresponds to the operating system (OS). The interface 35 is used to connect to the network 16 or the like.

<Process Procedure>

In the following, in a configuration of process blocks of the print control PC 12 in FIG. 4, a process flow for conducting the setting of the hot folder 33 and a process flow for editing the job by the operator who operates the print control PC 12 will be described.

<<Process for Conducting Setting of Hot Folder 33>>

For example, the job edit screen process part 42 displays the job edit screen 100 as illustrated in FIG. 6 for the operator. FIG. 6 is a diagram illustrating an example of the job edit screen 100. The job edit screen 100 in FIG. 6 includes a hot folder setting button 101, an edit waiting job confirmation dropdown list 102, and a job edit screen area 103.

The hot folder setting button 101 is operated by the operator to display a hot folder setting screen 200. When the hot folder setting button 101 is pressed by the operator, the job edit screen process part 42 causes the hot folder setting screen process part 41 to display the hot folder setting screen 200.

When the job is stored in the job retaining folder 55, the job edit screen process part 42 displays the edit waiting job confirmation dropdown list 102. The job edit screen process part 42 displays, in the edit waiting job confirmation dropdown list 102, job names of jobs (for which the edit application activation flag of the job ticket indicates ON) which are retained in the job retaining folder 55.

Also, the job edit screen process part 42 displays an edit screen of a job selected from the edit waiting job confirmation dropdown list 102 in the job edit screen area 103. The job edit screen 100 in FIG. 6 displays a state in which no job is selected from the edit waiting job confirmation dropdown list 102.

When the operator presses the hot folder setting button 101, the hot folder setting screen process part 41 displays the hot folder setting screen 200 as illustrated in FIG. 7. FIG. 7 is a diagram illustrating an example of the hot folder setting screen 200. The hot folder setting screen 200 in FIG. 7 displays the setting contents of the hot folder 33.

The hot folder setting screen 200 in FIG. 7 includes a hot folder selection field 201, a folder name setting field 202, a pagination setting field 203, a finishing setting field 204, an edit application activation flag setting field 205, an OK button 206, and a cancel button 207.

The hot folder selection field 201 displays a state in which the hot folder 33 is selected (that is, the hot folder selection field 201 indicates the hot folder 33 being selected). When the hot folder 33 is newly created, a "new creation" is selected from a hot folder list. Also, the folder name setting field 202 displays a setting state of a directory of the hot folder 33.

The pagination setting field 203 displays a setting state of the pagination process for the job input to the hot folder 33. The finishing setting field 204 displays a setting state of the finishing process for the job input in the hot folder 33. The edit application activation flag setting field 205 indicates whether to automatically activate the job edit program 31 prior to a print operation when the job is input into the hot folder 33.

When the operator presses the OK button 206, the hot folder setting screen process part 41 stores the setting contents set at the hot folder setting screen 200 into the hot folder setting storing part 52 through the communication parts 43 and 51. The hot folder setting screen process part 41 ends displaying the hot folder setting screen 200.

Moreover, when the operator presses the cancel button 207, instead of storing the setting contents set at the hot folder setting screen 200 in the hot folder setting storing part 52, the hot folder setting screen process part 41 ends displaying the hot folder setting screen 200.

A file of the job input into the hot folder 33 is automatically moved and deleted. Thus, for example, if the hot folder 33 is indicated as the folder of a system environment setting, a system environment may be damaged.

Moreover, a store-to folder is used to store the PDF file and the print job. For example, when the hot folder 33 is indicated as the store-to folder for the PDF file or the print job, a file stored in the hot folder 33 is automatically processed. As a result, an infinite loop may be caused so that the PDF file or the print job is automatically and repeatedly processed.

Accordingly, the hot folder setting screen process part 41 checks a folder path which is set as a directory of the hot folder 33 and is displayed in the folder name setting field 202. For example, the hot folder setting screen process part 41 controls not to set a folder which may damage the system environment such as a folder for the system environment setting, a folder which may cause the infinite loop, into the folder name setting field 202.

A job edit operation using the hot folder 33 performs from automatically editing the print job to the print process. Moreover, in the job edit operation using the hot folder 33, after the PDF file or the print job is automatically edited, an edit result may be used, instead of the print process.

Furthermore, in the setting contents of the hot folder 33 settable at the hot folder setting screen 200, there are setting contents which are not allowed to be combined. For example, in a case of the pagination for the small-sized book, only a double-sided print operation is conducted. Thus, an error occurs in the edit operation of the print job if a single-sided print operation is set. The hot folder setting screen process part 41 performs a prevention process of contents which are not allowed to be combined with each other, so that no error occurs in the edit operation of the print job and the print process.

<<Process for Editing Job>>

Figure 8:
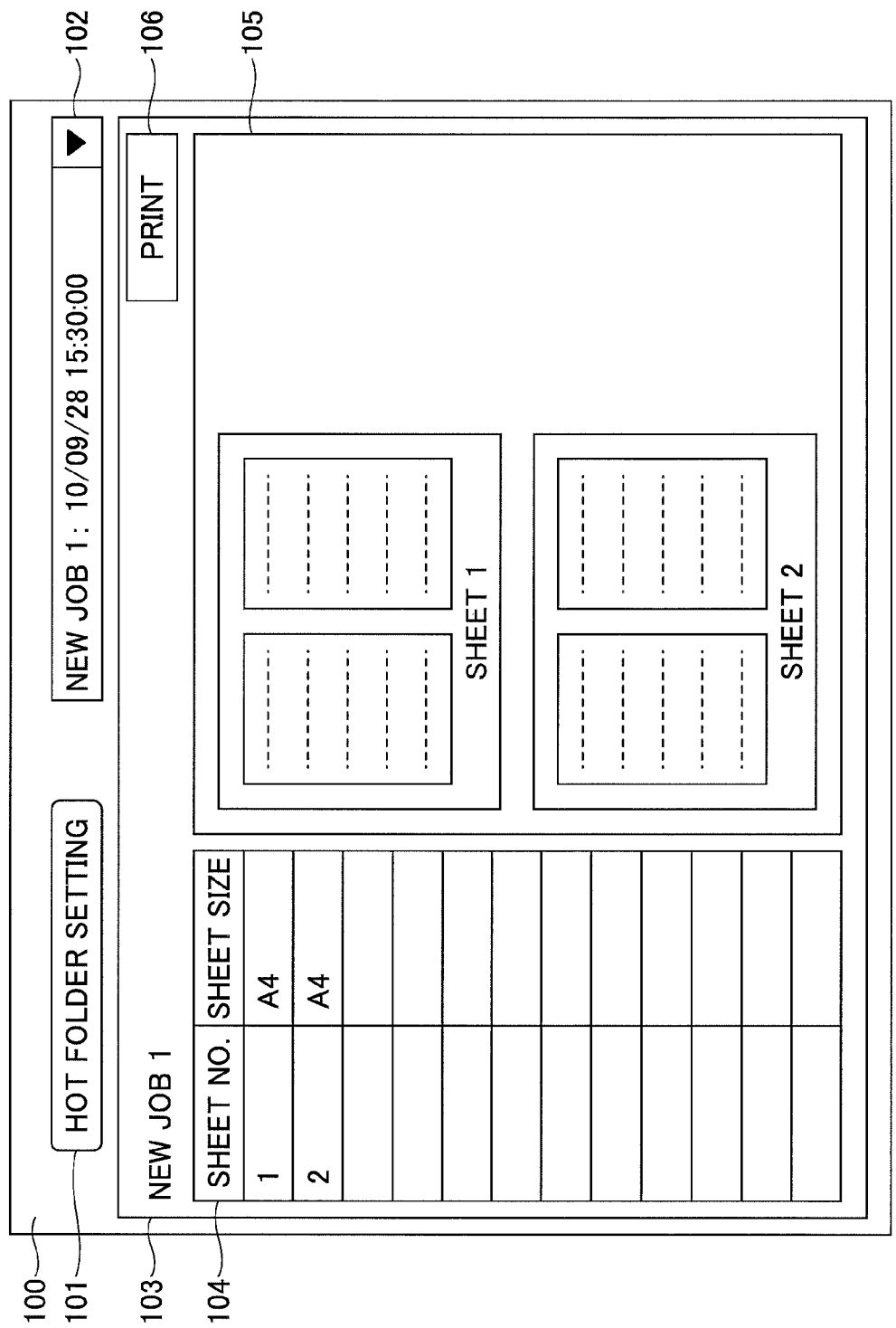
FIG. 8 is a diagram illustrating an example of the job edit screen in a state in which the job is selected.

When the job is selected from the edit waiting job confirmation dropdown list 102 by the operator, the hot folder setting screen process part 41 displays an edit screen for the job selected from the edit waiting job confirmation dropdown list 102 as illustrated in FIG. 8.

FIG. 8 is a diagram illustrating an example of the job edit screen 100 in a state in which the job is selected. The job edit screen 100 illustrated in FIG. 8 displays a state in which a "new job 1" is selected from the edit waiting job confirmation dropdown list 102. The job edit screen process part 42 displays an edit screen of the "new job 1" in the job edit screen area 103 for the job, as an example of the job stored in the job retaining folder 55 after the job is processed by the job process part 53.

The job edit screen area 103 includes sheet size information 104 for each of sheets of the job, a pagination state display area 105, and a print button 106. The job edit screen area 103 of the job in FIG. 8 illustrates a state of an A5 sheet size original with two A4 sheet size print sheets (simply called "sheet") imposed. Arrangements for editing the "new job 1" are omitted in the job edit screen 100 in FIG. 8.

For example, after confirming and editing the "new job 1" in the job edit screen 100 in FIG. 8, the operator can conduct a print request of the "new job 1" by pressing the print button 106. When the operator presses the print button 106, the job edit screen process part 42 sends the print request of the "new job 1" selected from the edit waiting job confirmation dropdown list 102 to the printer apparatus 14.

<<Hot Folder Monitor Process>>

Figure 9:
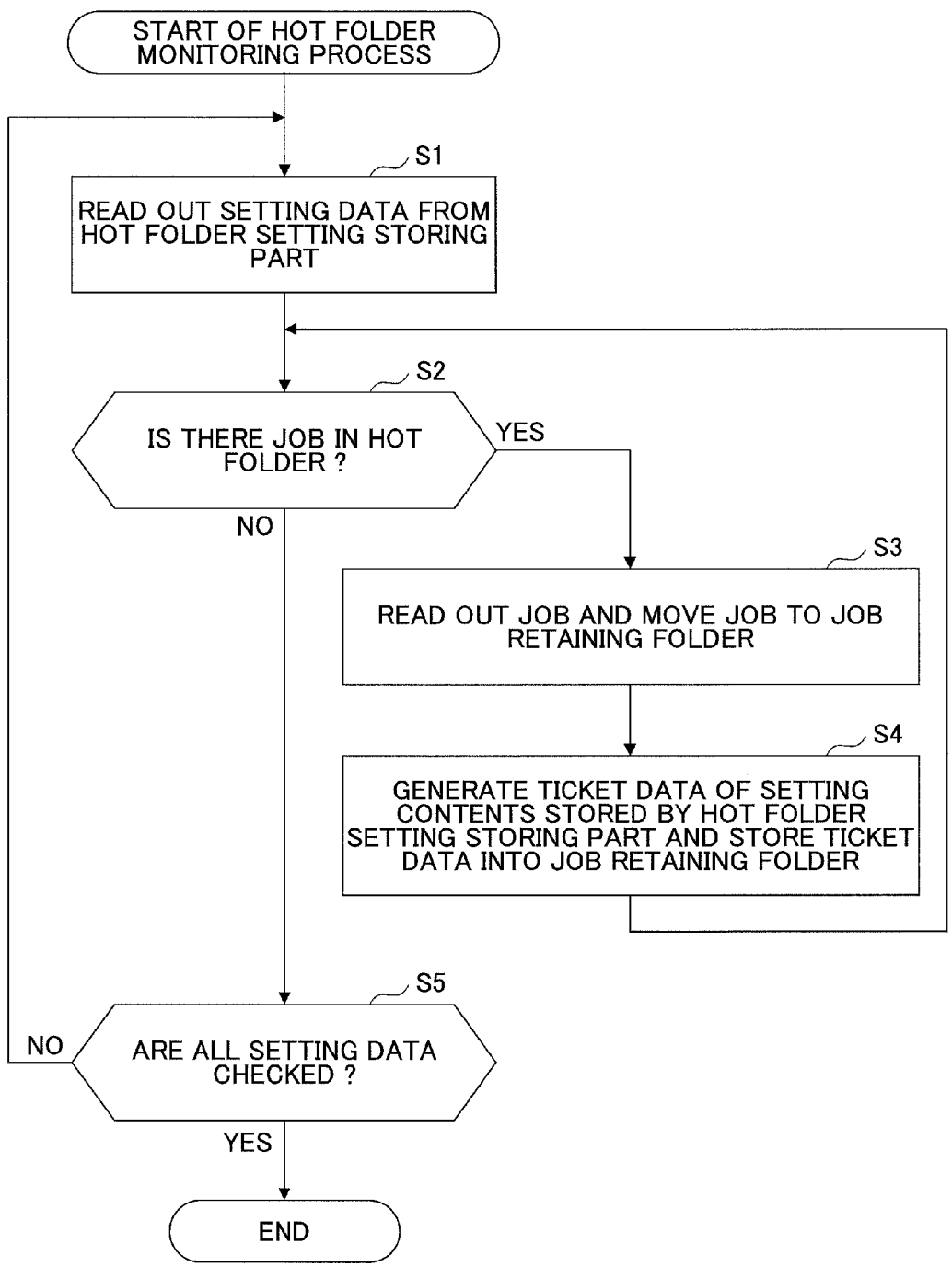
FIG. 9 is a flowchart for explaining an example of a hot folder monitor process performed by a hot folder monitor part.

FIG. 9 is a flowchart for explaining an example of a hot folder monitor process performed by the hot folder monitoring part 54. In step S1, the hot folder monitoring part 54 reads out one set of setting data (one of the setting contents of the hot folder 33) from the hot folder setting storing part 52. In step S2, the hot folder monitoring part 54 determines whether there is the job in the folder (a directory indicated in the folder name setting field 202) indicated by the setting data read out from the hot folder setting storing part 52.

If there is one or more jobs in the folder indicated by the setting data, in step S3, the hot folder monitoring part 54 reads out one job from the folder (hot folder 33) indicated by the setting data, and moves the job being readout to the job retaining folder 55. Also, in step S4, the hot folder monitoring part 54 generates the job ticket of the setting contents of the hot folder 33 stored in the hot folder setting storing part 52, and stores the job ticket with the job into the job retaining folder 55.

The hot folder monitoring part 54 repeats processes of the steps S2 through S4 until no job exists in the folder indicated by the setting data. When there is no job in the folder indicated by the setting data, in step S5, the hot folder monitoring part 54 determines whether all sets of the setting data stored in the hot folder setting storing part 52 are checked. A process of the step S5 checks whether a determination process for determining whether there is the job is performed for all hot folders 33.

If all sets of the setting data stored in the hot folder setting storing part 52 are not checked, the hot folder monitoring part 54 performs a process of step S1 again. The hot folder 33 monitoring part 54 repeats processes of the steps S1 through S5 until all sets of the setting data stored in the hot folder setting storing part 52 are checked. When all sets of the setting data stored in the hot folder setting storing part 52 are checked, the hot folder monitoring part 54 ends the hot folder monitor process in FIG. 9.

In the hot folder monitor process illustrated in FIG. 9, the job input into the hot folder 33 is stored with the job ticket of the setting contents of the hot folder 33 in the job retaining folder 55.

<<Job Process>>

Figure 10:
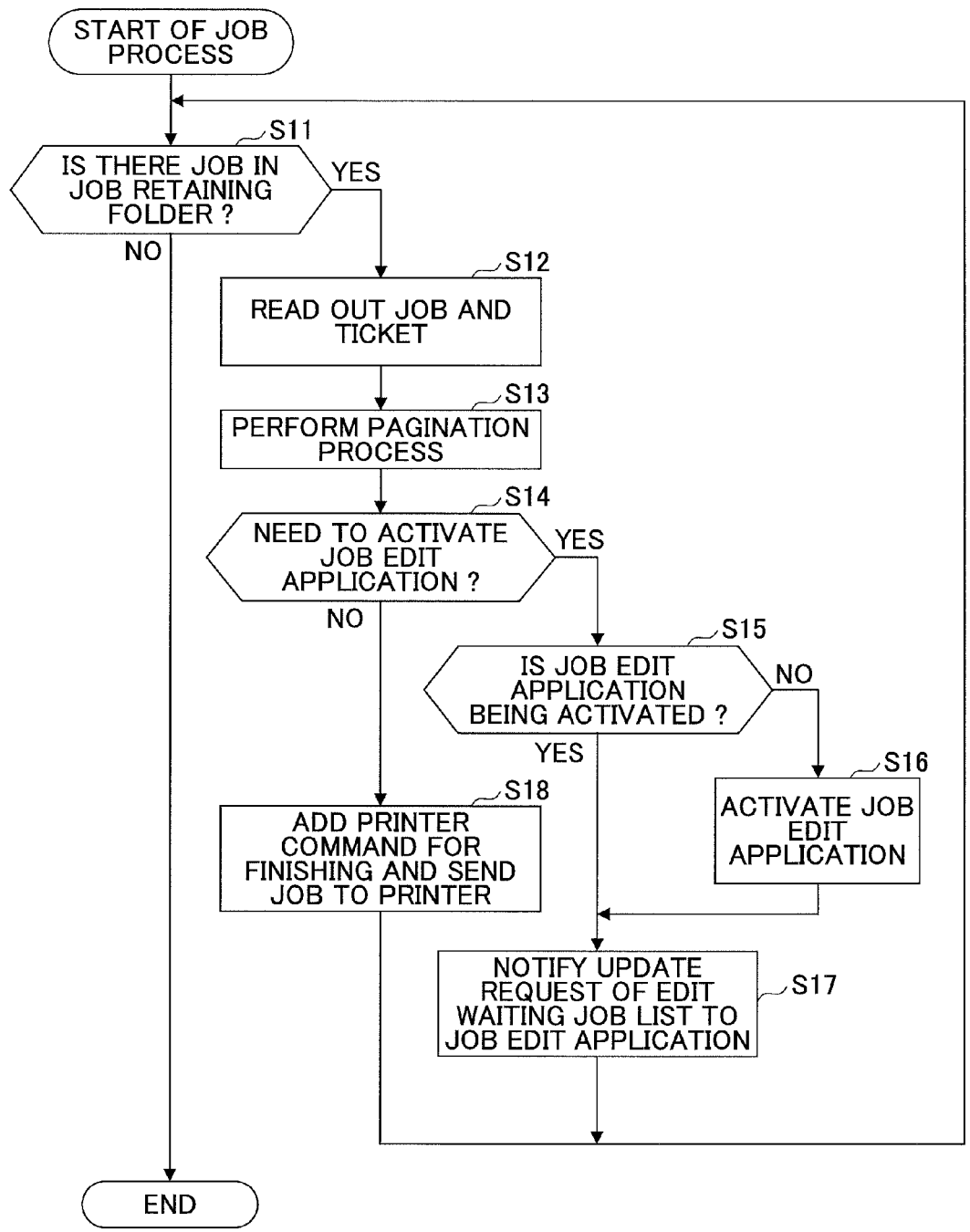
FIG. 10 is a flowchart for explaining an example of a job process conducted by a job process part.

FIG. 10 is a flowchart for explaining an example of a job process conducted by the job process part 53. In step S11, the job process part 53 checks whether there is the job in the job retaining folder 55. If there is the job in the job retaining folder 55, in step S12, the job process part 53 reads out the job and the job ticket corresponding to the job from the job retaining folder 55.

In step S13, based on the setting contents (a setting state of the pagination process illustrated in the pagination setting field 203) indicated by the job ticket, the job process part 53 executes the pagination process of the job. After the pagination process ends, in step S14, the job process part 53 determines whether the "edit application activation flag" indicates ON (that is, the edit application activation is needed to be activated).

If the "edit application activation flag" indicates ON, in step S15, the job process part 53 checks whether the job edit program 31 is being activated. When the job edit program 31 is not activated, in step S16, the job process part 53 activates the job edit program 31, and then, conducts a process of step S17.

Also, if the job edit program 31 is being activated, the job process part 53 conducts the process of step S17 after a process of step S15. In step S17, the job process part 53 sends the update request of the edit waiting job list to the job edit screen process part 42 through the communication parts 51 and 43. After the process of step S17, the job process part 53 returns to a process of step S11.

If the "edit application activation flag" indicates ON in the setting contents indicated by the job ticket, after a process of step S14, the job process part 53 conducts a process of step S18, and returns to the process of step S11.

In step S18, the job process part 53 adds a printer command for the finishing process to the job based on finishing information (a setting state of the finishing process indicated in the finishing setting field 204) in the setting contents indicated by the job ticket, and sends the job to the printer apparatus 14. After that, the job process part 53 returns to the process of step S11.

The job process part 53 repeats the processes of steps S11 through S18 until no job exists in the job retaining folder 55. The job process part 53 ends the job process as illustrated in FIG. 10 when no job exists in the job retaining folder 55.

By the job stored in the job retaining folder 55, the pagination process is executed based on the setting contents of the hot folder 33 indicated by the job ticket. After that, if the "edit application activation flag" indicates ON in the setting contents indicated by the job ticket, the job edit program 31 is capable of receiving the update request of the edit waiting job list from the job process part 53 before the job is sent to the printer apparatus 14.

<<Edit Waiting Job List Update Process>>

Figure 11:
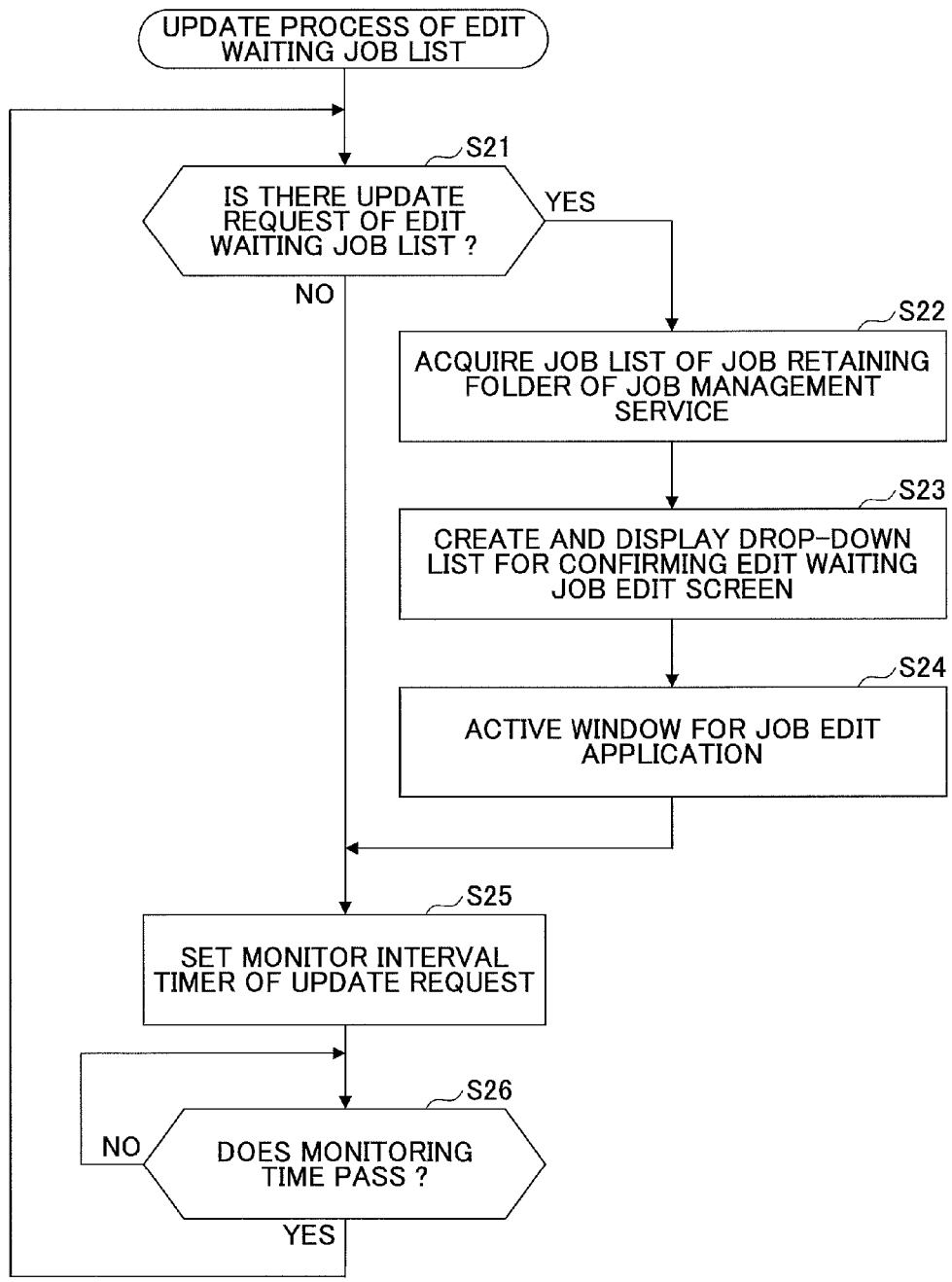
FIG. 11 is a flowchart for explaining an example of an edit waiting job list conducted by a job edit screen process part.

FIG. 11 is a flowchart for explaining an example of an edit waiting job list update process conducted by the job edit screen process part 42. In step S21, the job edit screen process part 42 determines whether the update request of the edit waiting job list from the job process part 53 is received.

When it is determined that the update request of the edit waiting job list is received, in step S22, the job edit screen process part 42 acquires the job list of jobs stored in the job retaining folder 55 through the communication parts 43 and 51.

In step S23, the job edit screen process part 42 creates the edit waiting job confirmation dropdown list 102, and displays the edit waiting job confirmation dropdown list 102 at the job edit screen 100. Accordingly, in step S24, the job edit screen process part 42 changes the job edit screen 100 to be an active window. By changing a display of the job edit screen 100 to be a foreground in multiple popup screens in a state of displaying the multiple popup screens in the entire display screen, the job edit screen 100 is displayed as the active window. After a process of step S24, the job edit screen process part 42 performs a process of step S25.

Moreover, when it is determined that the update request of the edit waiting job list is not received in step S21, the job edit screen process part 42 performs the process of step S25. In step S25, the job edit screen process part 42 sets a monitor interval timer for the update request of the edit waiting job list.

After that, in step S26, the job edit screen process part 42 waits until a monitoring time of the monitor interval timer for the update request of the edit waiting job list passes. The job edit screen process part 42 returns to the process of step S21 after the monitoring time passes.

By the edit waiting job list update process illustrated in FIG. 11, when the edit waiting job is stored in the job retaining folder 55, the job edit screen process part 42 can create the edit waiting job confirmation dropdown list 102, and display the edit waiting job confirmation dropdown list 102 at the job edit screen 100.

<Summary>

As described above, in the print control PC 12 in the first embodiment, in a case in which the job edit program 31 is not activated, when the job is input into the hot folder 33 and becomes an edit waiting job, the job edit program 31 is automatically activated and displays the edit waiting job confirmation dropdown list 102. The operator can confirm and edit the job by selecting the edit waiting job from the edit waiting job confirmation dropdown list 102. Also, in a case in which the job edit program 31 has been already activated, when the job is input into the hot folder 33 and becomes the edit waiting job, the print control PC 12 in the first embodiment automatically displays the edit waiting job confirmation dropdown list 102.

Accordingly, in the print control PC 12 in the first embodiment, it is possible for the operator who confirms and edits the edit waiting job to efficiently confirm and edit the edit waiting job input in the hot folder 33.

Second Embodiment

Figure 12:
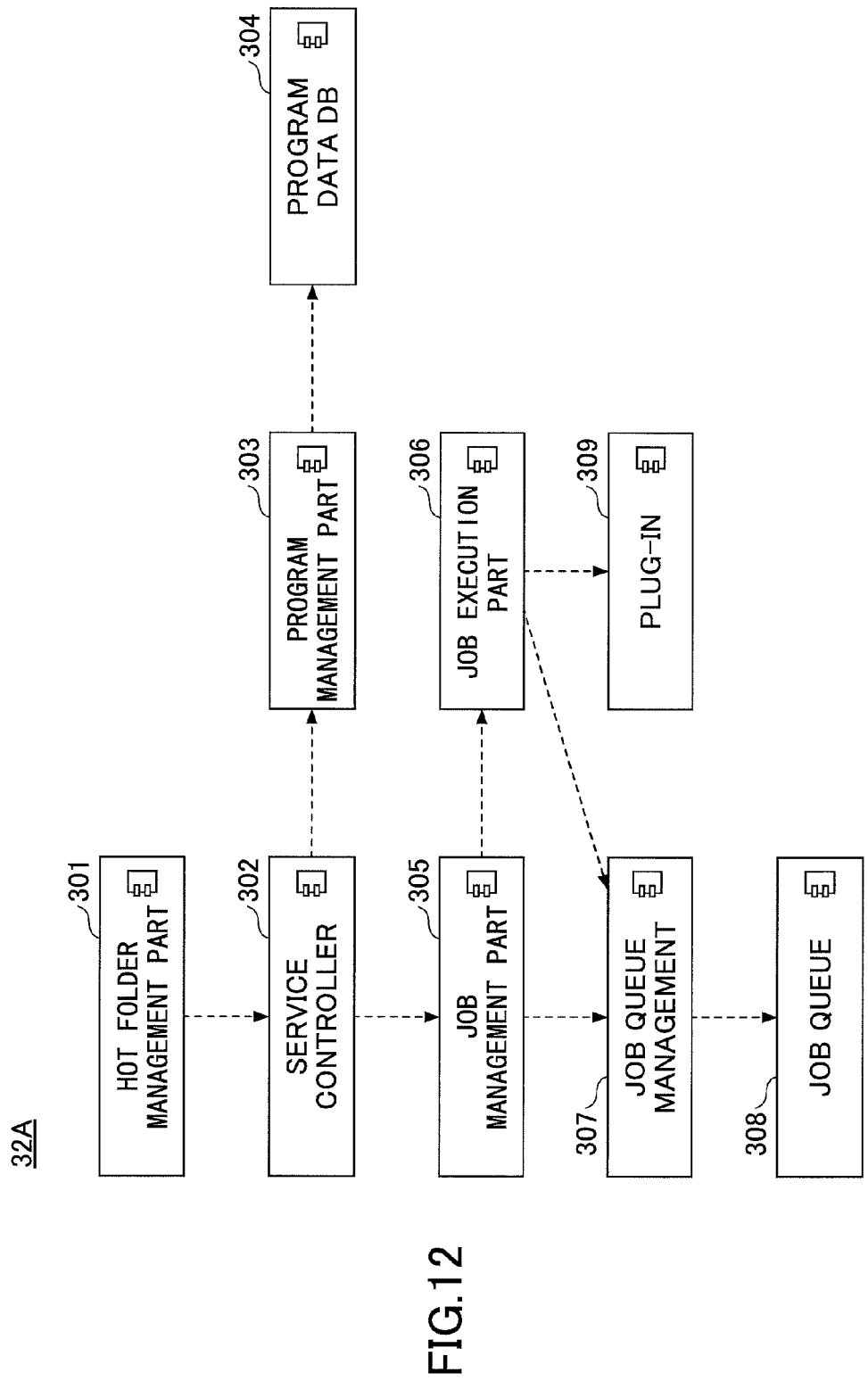
FIG. 12 is a diagram illustrating a software configuration of an example of a job management service.

A system configuration and a hardware configuration in a second embodiment are similar to those in the first embodiment, and explanations thereof will be omitted.
<Software Configuration>
In the second embodiment, for example, the print control PC 12 includes a job management service 32A illustrated in FIG. 12, instead of the job management service 32 in the software configuration illustrated in FIG. 4. Parts other than the job management service 32A in the second embodiment are the same as those in the software configuration in FIG. 4 in the first embodiment.

FIG. 12 is a diagram illustrating a software configuration of an example of the job management service 32A. The print control PC 12 realizes a hot folder management part 301, a service controller 302, a program management part 303, a program data DB 304, a job management part 305, a job execution part 306, a job queue management part 307, a job queue 308, and a plug-in 309.

The hot folder management part 301, the program management part 303, and the program data DB 304 correspond to the hot folder setting storing part 52, and the hot folder monitoring part 54 in FIG. 4. The service controller 302 corresponds to the communication part 51 in FIG. 4.

Figure 13:
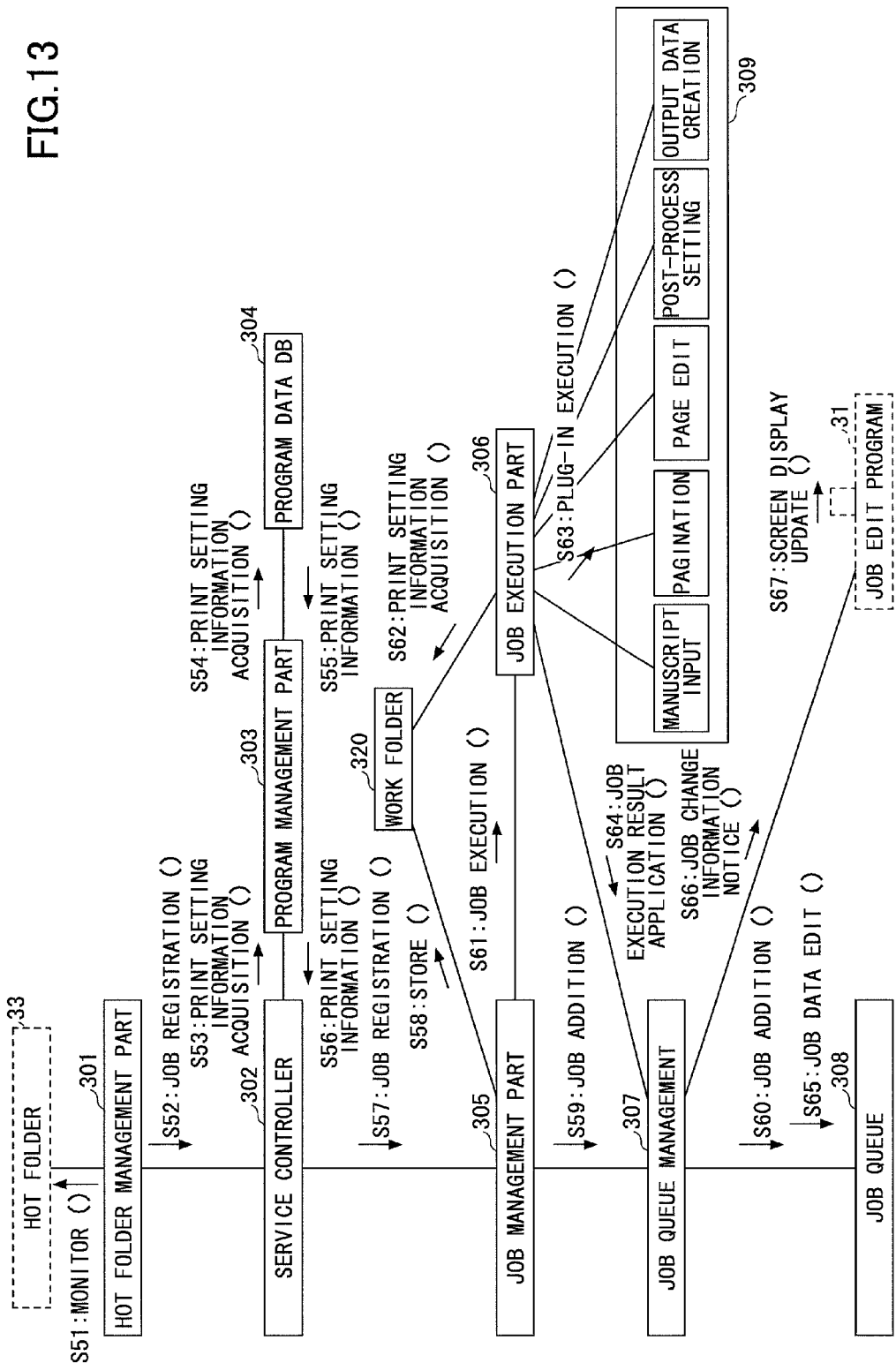
FIG. 13 is a flowchart for explaining an example of a process conducted by the job management service.

The job management part 305, the job execution part 306, and the plug-in 309 correspond to the job process part 35 in FIG. 4. Also, the job queue management part 307, and the job queue 308 correspond to the job retaining folder 55 in FIG. 4.
<Process Procedure>
In the following, a process flow of the job management service 32A in FIG. 12 will be described. FIG. 13 is a flowchart for explaining an example of a process conducted by the job management service 32A. In step S51, the hot folder management part 301 monitors the hot folder 33.

When a file is input into the hot folder 33, the job management service 32A advances to step S52, so that the hot folder management part 31 registers a job by sending a path of the file input into the hot folder 33 to the service controller 302. In step S53, the service controller 302 performs an acquisition request of print setting information. The print setting information corresponds to the setting contents of the hot folder 33 in the first embodiment.

In steps S54 and S55, the program management part 303 acquires the print setting information from the program data DB 304. In step S56, the program management part 303 sends the print setting information to the service controller 302.

In step S57, the service controller 302 registers the job by sending the path of the file (original file) input into the hot folder 33 and the print setting information acquired from the program management part 303.

In step S58, the job management part 305 stores the original file and the print setting information in a work folder 320. In step S59, the job management part 305 requires a job queue management part 307 to add the job to a job queue 308. In step S60, the job queue management part 307 adds the job to the job queue 308.

In step S61, the job management part 305 requests the job execution part 306 to execute the job in turn. In step S62, the job execution part 306 acquires the job in turn from the work folder 320.

In step S63, the job execution part 306 executes the plug-in 309 for the job based on the print setting information. As examples of the plug-in 309, a manuscript input plug-in, a pagination plug-in, a page edit plug-in, a post-process setting plug-in, and an output data creation plug-in are illustrated in FIG. 13. A setting state, in which the job is input into the hot folder 33 and the job edit program 31 is automatically activated prior to the print process, will be described.

In step S64, the job execution part 306 requests the job queue management part 307 to apply a job execution result in step S63 to the job registered in the job queue 308. In step S65, the job queue management part 307 edits data of the job registered in the job queue 308.

Figure 14:
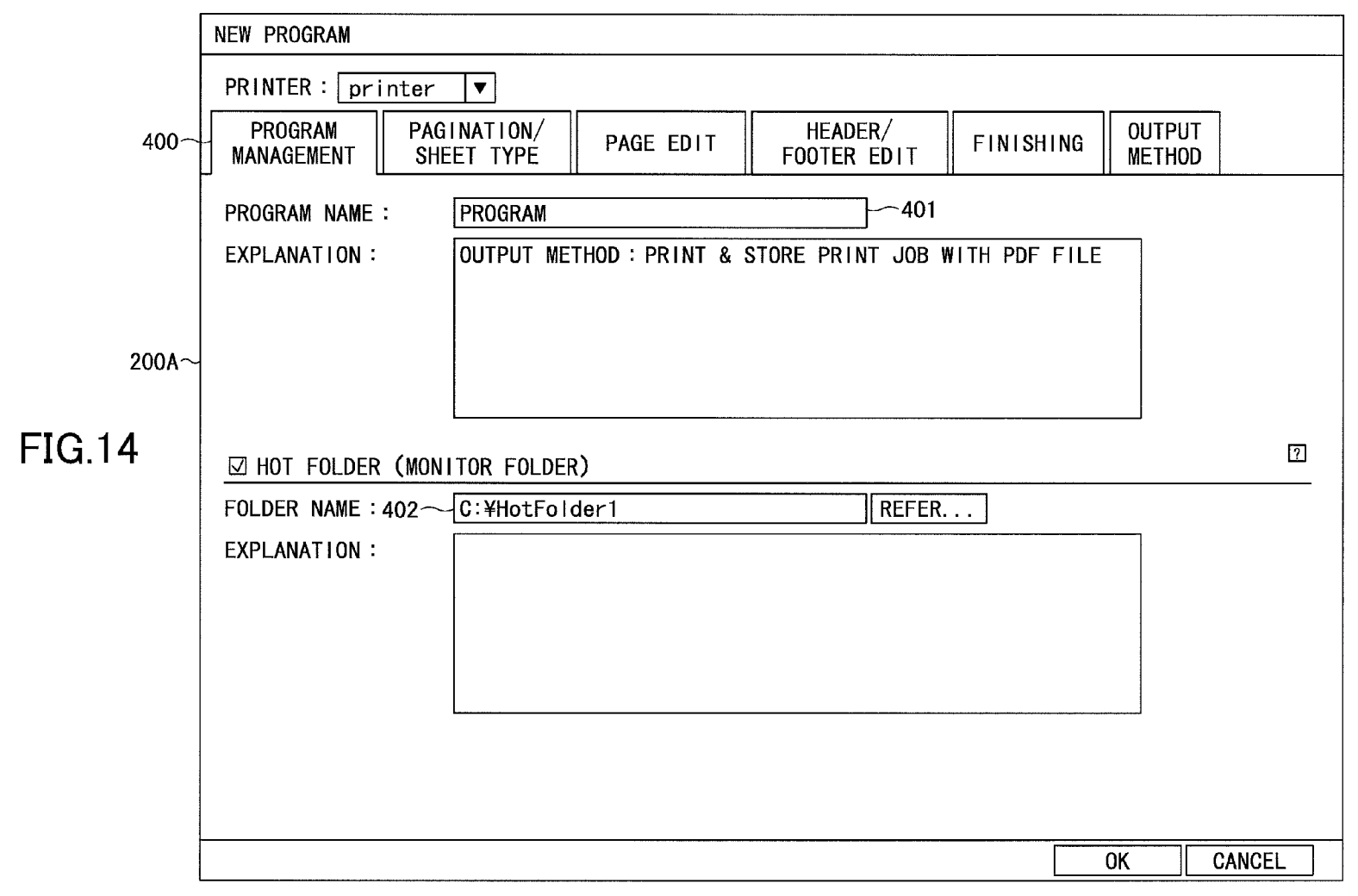

In step S66, the job queue management part 307 sends job change information to the job edit program 31. In the second embodiment, the job change information corresponds to the update request of the job list and the job list. After that, in step S67, the job edit program 31 creates the edit waiting job confirmation dropdown list 102, and displays the edit waiting job confirmation dropdown list 102 at the job edit screen 100.
<<Process for Setting Hot Folder 33>>
For example, the hot folder setting screen process part 41 in the job edit program 31 displays a hot folder setting screen 200A as illustrated in FIG. 14, a hot folder setting screen 200B as illustrated in FIG. 15, or the like at the output device 22 for the operator.

The hot folder setting screen 200A illustrates a screen example when a "PROGRAM MANAGEMENT" tab 400 is selected. The hot folder setting screen 200A includes a setting field 401 for a program name, and a setting field 402 for a directory of the hot folder 33. The setting field 401 is used to set a program name of a program which defines a process of the edit contents performed for the file input into the hot folder 33. The setting field 402 is used to set the directory of the hot folder 33.

The hot folder setting screen 200B illustrates a screen example when an "OUTPUT METHOD" tab 500 is selected. A check box 501 for an item "ACTIVATE JOB EDIT PROGRAM BEFORE PRINTING" included in the hot folder setting screen 200B corresponds to the edit application activation flag setting field 205 in FIG. 7. That is, by checking the check box 501 in the hot folder setting screen 200B, when the hot folder 33 is input, the job edit program 31 is automatically activated before the print process.

An explanation of each screen example of a "pagination/sheet type" tab, a "page edit" tab, a "header/footer edit" tab, and a "finishing" tab will be omitted. For example, functions settable from the hot folder setting screen 200B or the like are illustrated in FIG. 16. FIG. 16 is a diagram illustrating an example of functions settable from the hot folder setting screen 200B.

As the directory of the hot folder 33, for example, the following directories may be suppressed: directories of a desktop and directories under those, directories of the OS and directories under those, directories of a user profile and directories under those, a root directory, directories of a program file and directories under those, a store-to folder (that is, a store-to directory) of the print job indicated in the hot folder setting screen 200B and directories under that, a store-to folder (that is, a store-to directory) of a PDF file indicated in the hot folder setting screen 200B, directories under directories indicated as other hot folders 33, a folder to which the print control program is installed and directories under the folder, and data folders for the print control program and directories under the data folders.

<Summary>

As described above, in the print control PC 12 in the second embodiment, when the job is input into the hot folder 33, the job edit program 31 displays the edit waiting job confirmation dropdown list 102. The operator confirms and edits the job by selecting the edit waiting job from the job confirmation dropdown list 102.

Therefore, in the print control PC 12 in the second embodiment, it is possible for the operator to confirm and edit the edit waiting job.

According to the present invention, it is possible to provide a print control program, a print control apparatus, a print control method, and a print system, which can confirm the job being input and can edit the job.

The present invention is not limited to the specifically disclosed embodiments, and variations and modifications may be made without departing from the scope of the invention. In claims, a setting storing part corresponds to the hot folder setting storing part 52, a monitoring part corresponds to the hot folder monitoring part 54, a job process part corresponds to the job process part 53, a first folder corresponds to the hot folder 33, a second folder corresponds to the job retaining folder 55, a job edit screen process part corresponds to the job edit screen process part 42, and a first folder setting screen process part corresponds to the hot folder setting screen process part 41.

The present application is based on Japanese Priority Patent Applications No. 2011-020222 filed on Feb. 1, 2011, and No. 2011-269819 filed on Dec. 9, 2011, the entire contents of which are hereby incorporated by reference.

What is claimed is:

1. A non-transitory computer readable medium storing a program which, when executed by a computer, causes the computer to perform an information process comprising:

setting a process performed for a job stored in a first folder into a setting storage area;

monitoring storing the job into the first folder, and storing the job stored in the first folder and a job ticket indicating the process performed for the job stored in the first folder set in the setting storage area into a second folder;

processing the job by monitoring storing the job and the job ticket into the second folder, and by activating a job edit program to have an operator edit the job after the process indicated by the job ticket is performed for the job stored in the second folder;

processing a job edit screen so that the job edit screen is displayed at a display device in response to an activation of the job edit program, wherein in processing the job, an update request of an edit waiting job list for the job edit screen is made to process the job edit screen; and in processing the job edit screen, a list of the job stored in the second folder is acquired when the update request of the edit waiting job list for the job edit screen is notified, the edit waiting job list is created, and the job edit screen is displayed.

2. The non-transitory computer readable medium as claimed in claim 1, wherein in processing the job, information indicating whether the job edit program is required to be activated is confirmed in process contents indicated by the job ticket, and the job edit program is activated if the information indicates to activate the job edit program.

3. The non-transitory computer readable medium as claimed in claim 1, wherein in processing the job edit screen, the job edit screen, in which the edit waiting job list is updated, is changed to be an active window.

4. The non-transitory computer readable medium as claimed in claim 1, further comprising displaying a first folder setting screen at a display device, wherein in displaying the first folder setting screen, a path of the first folder set at the first folder setting screen is checked not to set a path which is not allowed to be set into the first folder.

5. The non-transitory computer readable medium as claimed in claim 4, wherein in displaying the first folder setting screen, for the job stored in the first folder set at the first folder setting screen, the first folder setting screen displayed at the display device allows setting a print process after a result from the process indicated by the job ticket is stored, an edit waiting process for the job which is conducted by the operator after the result from the process indicated by the job ticket is stored, or a storing process to store the result from the process indicated by the job ticket.

6. The non-transitory computer readable medium as claimed in claim 4, wherein in displaying the first folder setting screen, a prevention process is performed for a combination of processes which are not allowed to be combined with each other in processes performed for the job stored in the first folder set into the first folder setting screen.

7. The non-transitory computer readable medium as claimed in claim 6, wherein the first folder is a hot folder.

8. A control apparatus comprising:

a processor;

wherein the processor includes a setting storing part configured to set a process performed for a job stored in a first folder;

a monitoring part configured to monitor storing the job into the first folder, and storing the job stored in the first folder and a job ticket indicating the process performed for the job stored in the first folder set in the setting storage area into a second folder;

a job process part configured to monitor storing the job and the job ticket into the second folder, and to activate a job edit program to have an operator edit the job after the process indicated by the job ticket is performed for the job stored in the second folder;

wherein the job process part is further configured to:

process a job edit screen so that the job edit screen is displayed at a display device in response to an activation of the job edit program, and an update request of an edit waiting job list for the job edit screen is made to process the job edit screen;

wherein, a list of the job stored in the second folder is acquired when the update request of the edit waiting job list for the job edit screen is notified, the edit waiting job list is created, and the job edit screen is displayed.

9. An information process method performed in a computer, the method comprising:

monitoring storing a job into a first folder;

storing the job stored in the first folder and a job ticket indicating the process performed for the job stored in the first folder set in a setting storage area into a second folder;

monitoring storing the job and the job ticket into the second folder;

activating a job edit program for having an operator edit the job after performing the process indicated by the job ticket for the job stored in the second folder;

processing a job edit screen so that the job edit screen is displayed at a display device in response to an activation of the job edit program, wherein in processing the job, an update request of an edit waiting job list for the job edit screen is made to process the job edit screen; and in processing the job edit screen, a list of the job stored in the second folder is acquired when the update request of the edit waiting job list for the job edit screen is notified, the edit waiting job list is created, and the job edit screen is displayed.

10. An information processing system comprising:

an output apparatus; and a control apparatus, wherein the control apparatus includes, a setting storing part configured to set a process performed for a job stored in a first folder;

a monitoring part configured to monitor storing the job into the first folder, and to store the job stored in the first folder and a job ticket indicating the process performed for the job stored in the first folder set in a setting storage area into a second folder; and a job process part configured to monitor storing the job and the job ticket into the second folder, and to activate a job edit program to have an operator edit the job after the process indicated by the job ticket is performed for the job stored in the second folder, wherein the job process part is further configured to:

process a job edit screen so that the job edit screen is displayed at a display device in response to an activation of the job edit program, and an update request of an edit waiting job list for the job edit screen is made to process the job edit screen;

wherein, a list of the job stored in the second folder is acquired when the update request of the edit waiting job list for the job edit screen is notified, the edit waiting job list is created, and the job edit screen is displayed.

11. A non-transitory computer readable medium storing a program which, when executed by a computer, causes the computer to perform an information process comprising:

setting a process performed for a job stored in a first folder into a setting storage area;

monitoring storing the job into the first folder, and storing the job stored in the first folder and a job ticket indicating the process performed for the job stored in the first folder set in the setting storage area into a second folder;

processing the job by monitoring storing the job and the job ticket into the second folder, and by activating a job edit program to have an operator edit the job after the process indicated by the job ticket is performed for the job stored in the second folder; and displaying a first folder setting screen at a display device, wherein in displaying the first folder setting screen, a path of the first folder set at the first folder setting screen is checked not to set a path which is not allowed to be set into the first folder, and wherein in displaying the first folder setting screen, for the job stored in the first folder set at the first folder setting screen, the first folder setting screen displayed at the display device allows setting a print process after a result from the process indicated by the job ticket is stored, an edit waiting process for the job which is conducted by the operator after the result from the process indicated by the job ticket is stored, or a storing process to store the result from the process indicated by the job ticket.

12. A non-transitory computer readable medium storing a program which, when executed by a computer, causes the computer to perform an information process comprising:

setting a process performed for a job stored in a first folder into a setting storage area;

monitoring storing the job into the first folder, and storing the job stored in the first folder and a job ticket indicating the process performed for the job stored in the first folder set in the setting storage area into a second folder; and processing the job by monitoring storing the job and the job ticket into the second folder, and by activating a job edit program to have an operator edit the job after the process indicated by the job ticket is performed for the job stored in the second folder, wherein in displaying the first folder setting screen, a path of the first folder set at the first folder setting screen is checked not to set a path which is not allowed to be set into the first folder, and wherein in displaying the first folder setting screen, a prevention process is performed for a combination of processes which are not allowed to be combined with each other in processes performed for the job stored in the first folder set into the first folder setting screen.

13. A non-transitory computer readable medium storing a program which, when executed by a computer, causes the computer to perform an information process comprising:

setting a process performed for a job stored in a first folder into a setting storage area;

monitoring storing the job into the first folder, and storing the job stored in the first folder and a job ticket indicating the process performed for the job stored in the first folder set in the setting storage area into a second folder;

processing the job by monitoring storing the job and the job ticket into the second folder, and by activating a job edit program to have an operator edit the job after the process indicated by the job ticket is performed for the job stored in the second folder, wherein the first folder is a hot folder, and wherein in displaying the first folder setting screen, a prevention process is performed for a combination of processes which are not allowed to be combined with each other in processes performed for the job stored in the hot folder set into the first folder setting screen.

* * * * *